Figure 1:
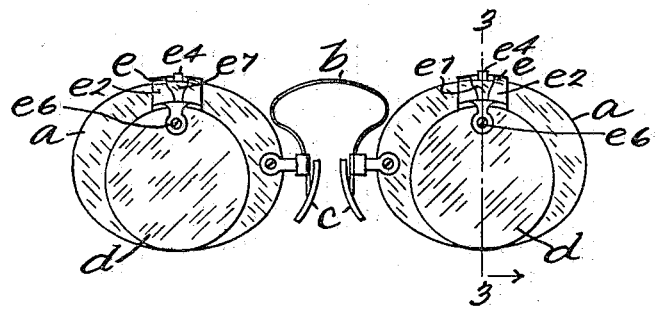

No. 809,702. PATENTED JAN. 9, 1906.
J. KOVACS.
EYEGLASSES AND SPECTACLES.
APPLICATION FILED SEPT. 19, 1905.

WITNESSES
J. C. Larsen
F. A. Stewart.

INVENTOR
Joseph Kovacs
BY Edgar Tate & Co
ATTORNEYS

UNITED STATES PATENT OFFICE.

JOSEPH KOVACS, OF NEWARK, NEW JERSEY.

EYEGLASSES AND SPECTACLES.

No. 809,702.     Specification of Letters Patent.     Patented Jan. 9, 1906.

Application filed September 19, 1905. Serial No. 279,080.

*To all whom it may concern:*

Be it known that I, JOSEPH KOVACS, a citizen of the United States, residing at Newark, in the county of Essex and State of New Jersey, have invented certain new and useful Improvements in Eyeglasses and Spectacles, of which the following is a specification, such as will enable those skilled in the art to which it appertains to make and use the same.

This invention relates to eyeglasses and spectacles; and the object thereof is to provide means whereby an ordinary pair of "distance" eyeglasses or spectacles may be conveniently changed whenever desired into "reading" eyeglasses or spectacles, a further object being to provide means whereby the focal distance of a pair of eyeglasses or spectacles may be changed from long distance to short distance whenever desired; and with these and other objects in view the invention consists in the provision of supplemental lenses, with means whereby they may be quickly, easily, and conveniently attached to the ordinary lenses of a pair of eyeglasses or spectacles in order to change the focal distance of the latter.

The invention is fully disclosed in the following specification, of which the accompanying drawings form a part, in which the separate parts of my improvement are designated by suitable reference characters in each of the views, and in which—

Figure 2:
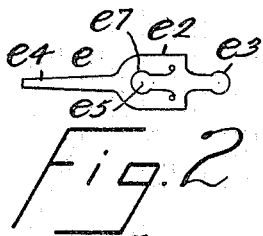
Figure 3:
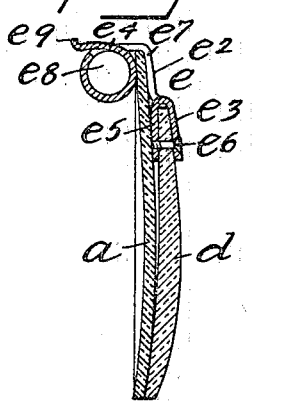

Figure 1 is a front view of a pair of ordinary eyeglasses provided with supplemental lenses whereby the eyeglasses are changed from what are known as "long-distance" glasses to what are known as "short-distance" or "reading" glasses, the supplemental lenses being connected with the main lenses of the eyeglasses by means of a spring attaching-clamp connected with the supplemental lenses; Fig. 2, a plan view of a blank from which the spring attaching-clamp is made, and Fig. 3 a section on the line 3 3 of Fig. 1.

In the drawings forming part of this specification 1 have shown an ordinary pair of eyeglasses, comprising the usual lenses $a$, connected by the usual nose-spring $b$ and provided with the nose-clips $c$, and in the practice of my invention I provide supplemental lenses $d$ of a focal power different from that of the main lenses $a$, said supplemental lenses $d$ being provided with spring-clamps $e$, by which they are connected with the top edges of the main lenses $a$. The spring-clamps $e$ are made from a blank (shown in Fig. 2) comprising an oblong body portion $e^2$, having a projecting member $e^3$ at one end and a projecting finger $e^4$ at the other end, and cut from the body portion $e^2$ of said blank, centrally thereof, is a spring-tongue $e^5$.

In practice the tongue $e^5$ is bent downwardly parallel with the projecting member $e^3$ to form jaws, as shown in Fig. 2, and the top edges of the supplemental lenses $d$ are inserted into these jaws and secured therein, as shown at $e^6$, preferably by means of a screw or similar device. The cutting of the tongue $e^5$ from the body portion $e^2$ of the blank forms an opening $e^7$ when said tongue is bent into the position shown in Fig. 2, and the finger $e^4$ or the end thereof is bent backwardly through said opening and formed into an eye or ring $e^8$, and the end of said finger is projected to form a hook member $e^9$, and the eye or ring $e^8$ forms, in connection with the body portion $e^2$ of the clamps $e$, a spring-catch into which the top edges of the lenses $a$ are inserted in the operation of connecting the supplemental lenses $d$ therewith.

The clamps $e$ are so formed as to securely hold the supplemental lenses $d$ in position on the main lenses $a$ when the former are required for use, and said supplemental lenses may be easily detached from the main lenses whenever necessary.

In practice the supplemental lenses $d$ when not in use may be carried in a suitable receptacle in the pocket or may be kept ready for use in any desired place, and by means of my improvement the focal distance of a pair of eyeglasses or spectacles may be changed whenever desired or what is known as "long-distance" glasses or spectacles may be changed to reading or short-distance glasses or spectacles.

My invention is also not limited to the suspension of the supplemental lenses $d$ from the top edges of the main lenses $a$, and the connection with the main lenses may be made at any point of the rim thereof.

Having fully described my invention, what I claim as new, and desire to secure by Letters Patent, is—

The herein-described means for changing the focal distance of a pair of eyeglasses or spectacles, comprising a supplemental lens provided with a spring-clamp formed from a blank comprising an oblong body portion provided at one end with a projecting member and at the opposite end with a projecting finger, the body portion being provided with a longitudinal spring-tongue which is cut from the central portion thereof, said end member and said tongue being formed into a U-shaped clamp in which the supplemental lens is secured, and said finger being formed into a spring-ring and in connection with said body portion of the blank forming a clamp to engage one of the lenses of the eyeglasses or spectacles, substantially as shown and described.

In testimony that I claim the foregoing as my invention I have signed my name, in presence of the subscribing witnesses, this 18th day of September, 1905.

JOSEPH KOVACS.

Witnesses:
F. A. STEWART,
C. J. KLEIN.